3,127,328
PROCESS OF PREPARING 6-DEMETHYL-
TETRACYCLINES
Joseph Jacob Goodman, Nanuet, N.Y., assignor to American Cyanamid Company, Stamford, Conn., a corporation of Maine
No Drawing. Filed Oct. 4, 1962, Ser. No. 228,262
12 Claims. (Cl. 195—80)

This invention relates to a novel process of preparing 6-demethyltetracyclines and more particularly is concerned with an improved process of producing 6-demethyltetracyclines by cultivating certain strains of microorganisms of the genus Streptomyces.

Prior to the present invention the only known way of producing the important antibiotics demethyltetracycline and demethylchlortetracycline was either by cultivating appropriate mutant strains of *Streptomyces aureofaciens* as described in the Patent to McCormick et al., No. 2,878,289, or by the blocking of the C–6 methyl group of the tetracycline nucleus by addition of a sulfonamide compound to an actively growing culture of *Streptomyces aureofaciens* as described in my prior Patent No. 3,019,172.

In accordance with the present invention it has now been found that the 6-demethyltetracyclines can be produced from chlortetracycline-producing microorganisms of the genus Streptomyces and particularly *Streptomyces aureofaciens*, when the medium has added thereto a 2-amino-4-lower alkyl thiobutanoic acid such as 2-amino-4-methylthiobutanoic acid, or a lower alkyl ester thereof such as ethyl-2-amino-4-methylthiobutanoate. It is only necessary to add an inhibiting amount of one of these compounds in order to produce the 6-demethyltetracyclines. In general, about 10 to 2,000 parts per million of such compounds has been found to be a suitable inhibiting amount.

The present invention is not particularly concerned with any specific microorganisms except to the extent that it is concerned with those microorganisms that produce chlortetracycline and tetracycline by fermentative biosynthesis. Insofar as is presently known, all such microorganisms are of the genus Streptomyces. The species *Streptomyces aureofaciens*, which produces chlortetracycline in fermentation media in which chloride ions are present as well as numerous natural and induced mutants, is, of course, preferably used and such microorganisms will, of course, also produce tetracycline when deprived of chloride ions. A number of other chlortetracycline-producing microorganisms and tetracycline-producing microorganisms have been mentioned in the patent literature as alleged distinct species of Streptomyces such as *Streptomyces viridifaciens*, *Streptomyces sayamaensis*, *Streptomyces feofaciens*, and still others. The published morphological data on these microorganisms is insufficient to determine conclusively whether or not they are new species or merely strains of *Streptomyces aureofaciens*. Regardless of this, however, the present invention is not predicated upon the selection of a particular species of microorganism so long as that microorganism will produce both chlortetracycline and tetracycline.

The conditions of the fermentation are generally the same as for the presently known methods of producing tetracycline, chlortetracycline, and demethylchlortetracycline by fermentation. That is, the fermentation medium contains the usual nutrients and mineral substances. Suitable nutrient substances include starch, dextrose, cane sugar, glucose, molasses, soybean meal, peanut meal, yeast, meat extracts, peptone, ammonium sulfate, urea, corn steep liquor, distillers solubles, inorganic salts and other conventional substances. The inorganic salts include such things as calcium carbonate, ammonium sulfate, ammonium chloride, and the various trace elements such as manganese, cobalt, zinc, copper, iron and the like.

The other general conditions of the fermentation such as hydrogen ion concentration, temperature, time, rate of aeration, preparation of the inoculum, sterilization, inoculation and the like are conventional and may be similar to those for the production of chlortetracycline shown in the United States Patent to Duggar, No. 2,482,055, for the production of tetracycline shown in the United States Patent to Minieri et al., No. 2,734,018, and for the production of 6-demethyltetracyclines shown in the United States Patent to McCormick et al., No. 2,878,289.

Demethylchlortetracycline and chlortetracycline, in the presence of each other, are difficult to assay by the commonly used instrumental methods. Therefore, the formation of demethylchlortetracycline may be detected primarily by paper chromatographic procedures. Semi-quantitation has been achieved by instrumentally scanning the intensity of the fluorescence produced by the various tetracyclines when the papergrams are subjected to ultraviolet light.

This invention will be described in further detail in conjunction with the following specific examples.

EXAMPLE I

A chlortetracycline fermentation medium is prepared as follows:

| | |
|---|---|
| Starch | 55 grams/liter. |
| Corn steep liquor | 25 grams/liter. |
| $CaCO_3$ | 9 grams/liter. |
| $(NH_4)_2SO_4$ | 5 grams/liter. |
| $NH_4Cl$ | 1.5 grams/liter. |
| $MgCl_2 \cdot 6H_2O$ | 2.0 grams/liter. |
| $FeSO_4 \cdot 7H_2O$ | 60 milligrams/liter. |
| $MnSO_4 \cdot 4H_2O$ | 50 milligrams/liter. |
| $ZnSO_4 \cdot 7H_2O$ | 100 milligrams/liter. |
| $CoCl_2 \cdot 5H_2O$ | 5 milligrams/liter. |
| Lard oil | 2% by volume. |

This medium is dispensed at the rate of 25 ml. per 250 ml. Erlenmeyer flask. To one set of flasks D-methionine is added at the rae of 0.5 gram per liter. The media are inoculated with a 24-hour-old inoculum of a chlortetracycline-producing strain of *Streptomyces aureofaciens* (S–77). The inoculum is grown in 100 ml. of the following medium per 100 ml. flask:

| | Grams/liter |
|---|---|
| Corn steep liquor | 20 |
| Sucrose | 30 |
| $(NH_4)_2SO_4$ | 2 |
| $CaCO_3$ | 7 |

Both the inoculum and the fermentation media are incubated at 25° C. on a rotary shaker rotating at 185 revolutions per minute. The fermentation media are harvested after 160 hours of incubation. Paper strip semi-quantitative assays are performed using a solvent system composed of 50 parts of butyl acetate, 10 parts of 5% trichloroacetic acid and 40 parts of 0.3 molar monobasic sodium phosphate, the system having a pH of 2. The results appear in Table I.

Table I

| D-methionine, Grams/liter | Chlortetracycline Micrograms/ml. | Demethylchlortetracycline Micrograms/ml. |
|---|---|---|
| 0.0 | (1) | |
| 0.5 | 3,850 | 83 |

[1] Denotes compound is present but is off-scale and therefore is a major component.

EXAMPLE II

The procedure of Example I is followed except that the Erlenmeyer flasks containing the media are divided into four groups. D-methionine is added to these flasks at the following rates: group I, 0.0 gram per liter; group II, 0.5 gram per liter; group III, 1.0 gram per liter; group IV, 2.0 grams per liter.

Chromatographic assays are performed utilizing the solvent system described in Example I. The results appear in Table II.

*Table II*

| D-methionine, Grams/liter | Chlortetracycline Micrograms/ml. | Demethylchlortetracycline Micrograms/ml. |
|---|---|---|
| 0.0 | 6,840 | |
| 0.5 | 4,660 | 115 |
| 1.0 | 4,825 | 225 |
| 2.0 | 3,590 | 130 |

EXAMPLE III

The procedure of Example II is followed except that the ethyl ester of DL-methionine is added to the Erlenmeyer flasks at the following rates: group I, 0.0 gram per liter; group II, 1.0 gram per liter; group III, 1.5 grams per liter.

The results appear in Table III.

*Table IIII*

| DL-methionine Ethyl Ester, Grams/liter | Chlortetracycline, Micrograms/ml. | Demethylchlortetracycline, Micrograms/ml. |
|---|---|---|
| 0.0 | 5,000 | 0 |
| 1.0 | 3,340 | 70 |
| 1.5 | 1,780 | 45 |

EXAMPLE IV

The procedure of Example I is followed except that a tetracycline-producing strain of *Streptomyces aureofaciens* is used. Examination of the harvest mash by the paper chromatographic assays used in Example I shows the presence of tetracycline and 6-demethyltetracycline.

I claim:

1. A process for the production of 6-demethyltetracyclines which comprises cultivating a microorganism of the genus Streptomyces selected from the group consisting of chlortetracycline-producing and tetracycline-producing microorganisms in an aqueous nutrient medium under aerobic conditions in the presence of an inhibiting amount of a compound selected from the group consisting of 2-amino-4-lower alkyl thiobutanoic acid and a lower alkyl ester thereof.

2. A process according to claim 1 in which the compound is 2-amino-4-methylthiobutanoic acid.

3. A process according to claim 1 in which the compound is ethyl-2-amino-4-methylthiobutanoate.

4. A process according to claim 1 in which the 6-demethyltetracycline is demethylchlortetracycline.

5. A process for the production of 6-demethyltetracyclines which comprises cultivating a chlortetracycline-producing strain of *Streptomyces aureofaciens* in an aqueous nutrient medium under aerobic conditions in the presence of an inhibiting amount of a compound selected from the group consisting of 2-amino-4-lower alkyl thiobutanoic acid and a lower alkyl ester thereof.

6. A process according to claim 5 in which the compound is 2-amino-4-methylthiobutanoic acid.

7. A process according to claim 5 in which the compound is ethyl-2-amino-4-methylthiobutanoate.

8. A process according to claim 5 in which the compound formed is demethylchlorotetracycline.

9. A process for the production of 6-demethyltetracyclines which comprises cultivating a tetracycline-producing strain of *Streptomyces aureofaciens* in an aqueous nutrient medium under aerobic conditions in the presence of an inhibiting amount of a compound selected from the group consisting of 2-amino-4-lower alkyl thiobutanoic acid and a lower alkyl ester thereof.

10. A process according to claim 9 in which the compound is 2-amino-4-methylthiobutanoic acid.

11. A process according to claim 9 in which the compound is ethyl-2-amino-4-methylthiobutanoate.

12. A process according to claim 9 in which the compound formed is 6-demethyltetracycline.

References Cited in the file of this patent

UNITED STATES PATENTS 3,061,522     Neidleman     Oct. 30, 1962